June 7, 1955    R. M. ASHBY    2,710,362
ELECTRONIC COMPUTING APPARATUS
Filed Feb. 9, 1953
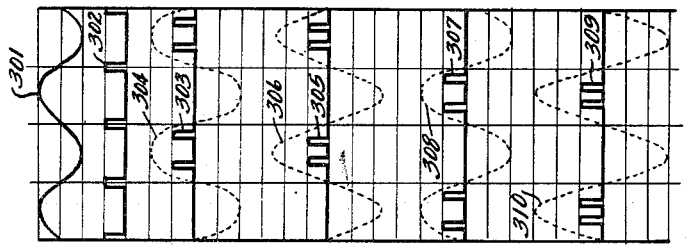
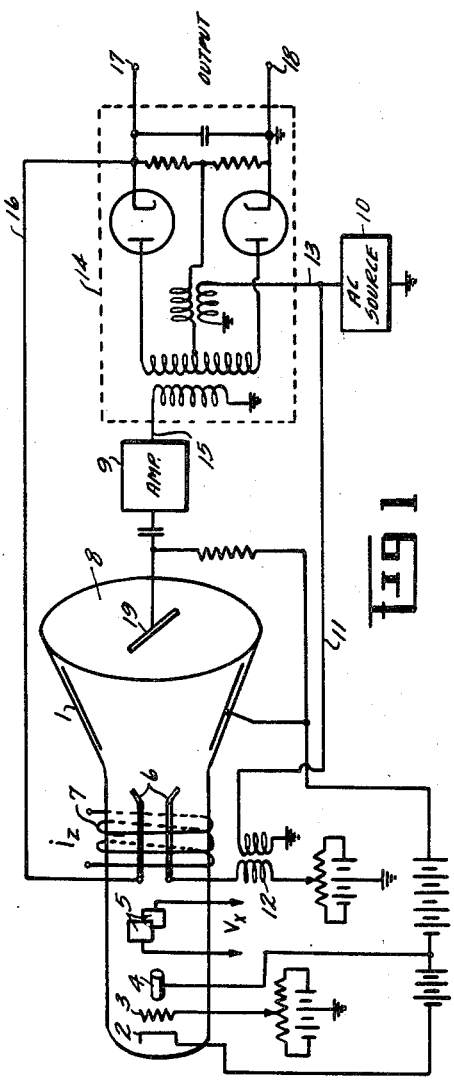
INVENTOR.
ROBERT M. ASHBY

United States Patent Office 2,710,362
Patented June 7, 1955

2,710,362

ELECTRONIC COMPUTING APPARATUS

Robert M. Ashby, Pasadena, Calif., assignor to the United States of America as represented by the Secretary of the Air Force Application February 9, 1953, Serial No. 335,805

3 Claims. (Cl. 315—21)

This invention relates to an electronic computing apparatus and more particularly to an electronic apparatus which will produce the product of two functions. This application is a continuation-in-part of my application Serial Number 256,336, entitled "Pickup System for Electronic Multiplier," filed November 14, 1951.

An electronic computer for producing the product of two functions is described in British publication, "Nature," volume 163, April 23, 1949, at page 650. In this article a system is described comprising a cathode ray tube whose face is masked below a horizontal diametric line thereacross. A voltage proportional to a first function is applied to conventional horizontal deflecting plates and a current proportional to a second function is applied to a magnetic field producing coil which produces a field axially of the cathode ray tube. That magnetic coil surrounds a pair of vertical deflecting plates. When the field produced by the magnetic coil tends to deflect the cathode ray beam above the center line, a photocell in front of the tube receives a light signal which is amplified and then fed to the vertical deflecting plates in a sense to counteract or nullify the vertical deflecting effect of the magnetic coil. The horizontal deflecting plates cause the beam to be swept horizontally with a velocity V proportional to the voltage on the horizontal deflecting plates. The force on the electrons moving with velocity V in the magnetic field H produced by the magnetic coil is proportional to the product HV. As a result, the potential which is applied to the vertical deflecting plates is, at any given instant, proportional to the product HV.

In accordance with this invention, instead of using a photo-cell and masked cathode ray tube, either a wire is attached to the face of the cathode ray tube or a conducting line is painted on to the face of the cathode ray tube to pick up the signal therefrom. The conducting line, or wire, may be either on the inside face or on the outside face of the tube.

In another form of this invention, the pick up comprises a pair of wires attached to, or a pair of conducting lines painted on the tube face, and a balanced output circuit from those two wires or lines is used to produce a signal which is applied to the vertical deflecting plates.

Previously known types of computers, which used a photosensitive arrangement to produce the vertical deflecting potentials, have the inherent limitations which are caused by the photosensitive element being sensitive to changes in ambient light, and therefore will not always produce an output which is a true function of the product.

An object of this invention is to provide an electronic computer for multiplying, which is more accurate and more simple in construction than previously known electronic computers of this type.

The above object, as well as other objects, features and advantages of the apparatus of this invention will be more clearly understood in view of the following description when taken in conjunction with the drawing wherein:

Fig. 1 is a schematic diagram in simplified form of an electronic computer for producing an output which is a function of the product of two input functions which is constructed in accordance with the principles of this invention.

Fig. 2 is a schematic diagram of a modified form of an electronic computer for producing an output which is a function of the product of two input functions which apparatus is constructed in accordance with the principles of this invention.

Fig. 3 is a family of curves which indicate the potentials at various points in the apparatus of Fig. 1.

Referring now to Fig. 1, the cathode ray tube 1 is provided with a cathode 2, a control grid 3, a beam forming electrode 4, a pair of horizontal deflecting plates 5 and a pair of vertical deflecting plates 6. In addition to these conventional cathode ray tube elements, a coil 7 is adjacent to and surrounds the vertical deflecting plates as clearly shown in Fig. 1.

A conducting line 19 is painted on the inner face or outer face 8 of the tube with conducting paint. Alternatively, a wire may be attached to the face 8 of the tube. The conducting line, or wire, is connected to the input of an amplifier 9. Amplifier 9 is a band pass amplifier centered at a frequency F. The band width of amplifier 9 need only be broad enough to pass the information side bands which are quite narrow.

An A. C. source 10 supplies a signal of frequency F to the vertical deflecting plates 6 of the cathode ray tube 1 by way of conductor 11 and may be applied to the vertical deflecting plates 6 through a transformer 12. The output of the A. C. source 10 is also applied by way of conductor 13 to a phase sensitive detector 14. The output of amplifier 9 is also applied to the phase sensitive detector 14 by way of conductor 15. The output of the phase sensitive detector is applied to the vertical deflecting plates by way of conductor 16. The output of the phase sensitive detector 14 is also available at output terminals 17 and 18.

One of the voltages to be multiplied, $V_x$, is applied to the horizontal deflecting plates 5 of cathode ray tube 1. A second input to be multiplied, $i_z$, is introduced as a current into the magnetic coil 7 producing an axial magnetic field $H_z$ surrounding and localized around the vertical deflecting plates 6. This combination would normally produce a vertical deflection of the beam proportional to the product $V_x H_z$ or $KV_x i_z$.

The signal of frequency F from A. C. source 10 supplied to the vertical deflecting plates 6 causes the electron beam to be deflected at frequency F. If the beam is centered on the conducting line 19 a series of pulses equally spaced in time will appear on conductor 19 and there will be two pulses for each cycle of the A. C. signal from the A. C. source 10, and therefore this complex wave of a series of pulses will have as its fundamental A. C. component an A. C. signal having a frequency 2F.

Referring now to Fig. 3, which shows a family of curves in which curve 301 is representative of a signal having a frequency F from the output of the A. C. source 10. When the electron beam is centered on the conducting line 19 and A. C. potential from the A. C. source 10 is applied to the vertical deflecting plates 6, the beam will be deflected above and below that conducting line 19 equal distances, and whenever the beam passes the conducting line 19 a pulse will be applied to the input of amplifier 9. Curve 302 is representative of the pulses applied to the input of amplifier 9 when the beam is centered on conducting line 19, and it will be noted that since there are two pulses for each cycle of the A. C. signal from A. C. source 10 the fundamental A. C. component of the complex wave 302 will have a frequency twice that of the wave 301, and since the amplifier 9 will not pass a signal which is twice the frequency of A. C. source 10 there will be no signal appearing on conductor 15, and therefore the phase sensitive detector 14 will produce no output.

Assuming now that the potential $V_x$ applied to the horizontal deflecting plates 5 and the current $i_z$ applied to the magnetic coil 7 are such as to cause the center of the beam to be moved above conducting line 19. The pulses applied to the amplifier 9 will then be spaced in time not equally as above described but will be spaced in time such for example as those represented in curve 303, and the fundamental component represented by curve 304 will have a frequency equal to the curve 301 and will be opposite in the phase to the curve 301. This fundamental component will then be passed and amplified by the amplifier 9 and applied by way of conductor 15 to the phase sensitive detector 14 and since that fundamental component 304 is opposite in phase to the A. C. signal from A. C. source 10 the phase sensitive detector 14 will produce a signal at its output having a polarity such as to cause the beam to be deflected downward to once again cause the beam to be centered on conducting line 19. As the center of the beam moves further upward from the horizontal conducting line 19 the pulses applied to the input of amplifier 9 will then move closer together, as shown by curve 305, which will have the effect of increasing the amplitude of its fundamental component represented by the curve 306, and since that fundamental component is increased in amplitude the phase sensitive detector 14 will produce an even larger output, and therefore cause the beam once again to be centered on the conducting line 19.

Assuming now that the center of the beam is moved downward from the conducting line 19, the pulses applied to the amplifier 9 would be spaced in time as represented by the curve 307 and the fundamental component of that complex wave will be such as that shown by curve 308 and it will be noted that the phase of that fundamental component is in phase with the signal from the A. C. source 10. That fundamental component being amplified and applied to the phase sensitive detector 14 will cause a potential to be developed at the output of the phase sensitive detector 14 which is of such polarity and amplitude as to cause the beam to be centered on the conducting line 19. Should, however, the center of the beam be deflected downward even further than as above described, the pulses applied to the input of the amplifier 9 would have a spacing such as represented by curve 309, and the fundamental component of that complex wave has the same phase as curve 308 and is merely increased in amplitude which will produce an even greater amplitude output from the phase sensitive detector 14 which amplitude would be sufficient to cause the beam to be centered on the conducting line 19.

The output potential at terminals 17 and 18 will therefore obviously be representative of the product of the two functions $V_x$ and $i_z$.

In the form of this invention which is illustrated in Fig. 2, instead of causing the beam to be swept vertically by the output of the A. C. source 10, the output of A. C. source 10 is applied to the control electrode 3 which will cause the beam to be intensity modulated and instead of a single electrode 19, this form of the invention uses two parallel spaced horizontal lines or wires 19' and 19''. The electrodes 19' and 19'' are equally spaced from the center of the face 8 of tube 1 and therefore when the beam is centered on the face 8 and the beam intensity is modulated by the A. C. source 10, the signals on electrodes 19' and 19'' will be of equal amplitudes and due to the balanced circuit 200, no signal will be applied to the input of amplifier 9. Should, however, the beam be moved downward from the center, electrode 19'' will receive more signal than electrode 19' and due to the balanced circuit 200 a signal having a predetermined phase relation to the output of A. C. source 10, will be applied to amplifier 9. Should the beam be moved upward from the center, electrode 19' will receive more signal than electrode 19'' and due to the balanced circuit 200 a signal having an opposite phase will be applied to the amplifier 9.

The rest of the apparatus of Fig. 3 is identical to that of the apparatus of Fig. 2 and therefore its operation will be understood without further comment.

Although the described and illustrated embodiments of this invention have been shown in detail, it will be understood that those illustrations are merely by way of example and many modifications, additions and omissions may be made without departing from the scope of this invention.

What is claimed is:

1. An electronic analogue computer comprising a cathode ray tube having means to form an electron beam; means to deflect said beam in one plane proportional to a first factor to be multiplied; means to produce an electromagnetic field axially to said cathode ray tube whose field intensity is a function of a second factor to be multiplied; a pair of deflecting plates in said magnetic field oriented to deflect said beam in a plane normal to said one plane when potential is applied therebetween; a source of fixed frequency alternating voltage; means for varying a parameter of said beam in accordance with the instantaneous amplitude of said alternating voltage; an elongated electrode structure having an axis lying in said one plane and perpendicular to the axis of said tube, said electrode axis being intersected by the axis of said beam; an error signal circuit connected to said electrode structure such that a displacement of the average position of the axis of said beam from said one plane produces an error signal in said circuit having the frequency of said alternating voltage, an amplitude proportional to the amount of said deflection, and a phase the same as or opposite to that of said alternating voltage depending upon the direction of said displacement; a phase sensitive rectifier; means for applying said error signal and said alternating voltage to said rectifier; and means for applying the direct output voltage of said rectifier between said deflecting plates in such direction as to oppose said beam displacement.

2. An electronic computer comprising a cathode ray tube having means to form an electron beam, means to deflect said beam in one plane proportional to a first factor to be multiplied, means to produce an electromagnetic field axially to said cathode ray tube whose field intensity is a function of a second factor to be multiplied, a pair of deflecting plates in said electromagnetic field and oriented to deflect said beam in a plane at right angles to said one plane when potential is applied, a narrow elongated electrode having its axis in said one plane and passing through the axis of said cathode ray tube; a source of alternating current having a predetermined frequency, means to apply the output of said source of alternating current to said pair of deflecting plates whereby when said beam is swept at right angles to the axis of said elongated electrode a pulse of energy will be received by said elongated electrode every time said beam passes said elongated electrode, a band pass circuit having an input and an output and having a center frequency substantially equal to said predetermined frequency, said band pass circuit being capable of rejecting harmonics of said predetermined frequency circuit means to connect said elongated electrode to said input of said band pass circuit, a phase sensitive detector, circuit means to connect the output of said band pass circuit and the output of said source of alternating current to said phase sensitive detector and means to connect the output of said phase sensitive detector to said pair of deflecting plates.

3. An electronic computer comprising a cathode ray tube having means to form an electron beam, means to deflect said beam in one plane proportional to a first factor to be muptiplied, means to produce an eletromagnetic field axially to said cathode ray tube whose field intensity is a function of a second factor to be multiplied, a pair of deflecting plates in said electromagnetic field and oriented to deflect said beam in a plane normal to said one plane when potential is applied thereto; a source of alternating current having a predetermined frequency, means to cause said beam to be varied in intensity as a function of said alternating current, a pair of parallel spaced elongated electrodes having their axis in said one plane and equidistantly spaced from the axis of said beam when said beam is not deflected, a phase sensitive detector, a transformer having a center-tapped primary, means connecting said beam forming means through a source of positive potential to said center tap, means connecting said electrodes to the ends of said primary, means for coupling the secondary of said transformer to said phase sensitive detector, means coupling said source of alternating current to said phase sensitive detector, and means to apply the output of said detector to said pair of deflecting plates.

References Cited in the file of this patent

UNITED STATES PATENTS

| | | |
|---|---|---|
| 2,455,532 | Sunstein | Dec. 7, 1948 |
| 2,461,667 | Sunstein | Feb. 15, 1949 |
| 2,462,263 | Haynes | Feb. 22, 1949 |
| 2,508,408 | Liebson | May 23, 1950 |

OTHER REFERENCES

Article by Deeley and Mackay in "Nature," April 23, 1949, page 650, vol. 163.